（12）United States Patent
Hada et al.

(10) Patent No.: US 9,672,323 B2
(45) Date of Patent: Jun. 6, 2017

(54) REDUCTION OF WARPAGE OF MULTILAYERED SUBSTRATE OR PACKAGE

(71) Applicant: International Business Machines Corporation, Armonk, NY (US)

(72) Inventors: Sayuri Hada, Tokyo (JP); Keiji Matsumoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/086,984

(22) Filed: Mar. 31, 2016

(65) Prior Publication Data

US 2016/0217247 A1  Jul. 28, 2016

Related U.S. Application Data

(62) Division of application No. 14/193,004, filed on Feb. 28, 2014, now Pat. No. 9,384,314.

(51) Int. Cl.
 G06F 17/50 (2006.01)
(52) U.S. Cl.
 CPC ...... *G06F 17/5081* (2013.01); *G06F 17/5068* (2013.01); *G06F 17/5086* (2013.01)
(58) Field of Classification Search
 CPC ... B32B 37/144; B32B 37/18; H01L 25/0657; H01L 23/5384
 USPC ........................... 438/478, 15, 106, 112, 125
 See application file for complete search history.

(56) References Cited

U.S. PATENT DOCUMENTS

| 7,260,806 | B2 | 8/2007 | Fukuzono et al. |
| 8,260,571 | B2 | 9/2012 | Kubota et al. |
| 9,384,314 | B2 * | 7/2016 | Hada .................. G06F 17/5068 |
| 2006/0212155 | A1 | 9/2006 | Fukuzono et al. |

(Continued)

FOREIGN PATENT DOCUMENTS

| JP | 3329667 | 9/2002 |
| JP | 2006261381 A | 9/2006 |

(Continued)

OTHER PUBLICATIONS

Oda et al., "Analysis of stress and deflection of printed plate board using multilayered beam theory" in J. of Japan Society of Mech. Eng., 59, (1993) p. 205-208.

*Primary Examiner* — Hoa B Trinh
(74) *Attorney, Agent, or Firm* — Scully, Scott, Murphy & Presser, P.C.; David M. Quinn, Esq.

(57) ABSTRACT

A method that minimizes adjustment of a wiring layer in reducing a warpage of a multilayered substrate and enables location of a part of a wiring layer that needs correction in order to reduce the warpage. The difference in average coefficient of thermal expansion, $\Delta\alpha$, varies in a substrate. The method focuses in on the difference in $\Delta\alpha$ with a great length scale (low frequency) having a relatively significant effect on the warpage compared to the difference in $\Delta\alpha$ with a smaller length scale (high frequency) and corrects only the difference in $\Delta\alpha$ with a greater length scale. The distribution of the difference in $\Delta\alpha$ in a plane of substrate is determined. Then digital filtering is performed to extract only the difference in $\Delta\alpha$ with a low frequency and the difference in $\Delta\alpha$ between before and after correction, thereby revealing a part that requires correction.

10 Claims, 14 Drawing Sheets

(56) References Cited

U.S. PATENT DOCUMENTS

2010/0023299 A1 1/2010 Kubota et al.
2011/0285026 A1 11/2011 Bchir

FOREIGN PATENT DOCUMENTS

| JP | 4204524 | 1/2009 |
|----|---------|--------|
| JP | 4204530 | 1/2009 |
| JP | 2009260123 | 11/2009 |
| JP | 2010026839 A | 2/2010 |
| JP | 2010087145 | 4/2010 |
| JP | 2010118523 | 5/2010 |
| JP | 2011014865 | 1/2011 |
| JP | 2011039741 A | 2/2011 |
| JP | 2012003460 | 1/2012 |
| WO | WO2010002187 | 2/2010 |

* cited by examiner

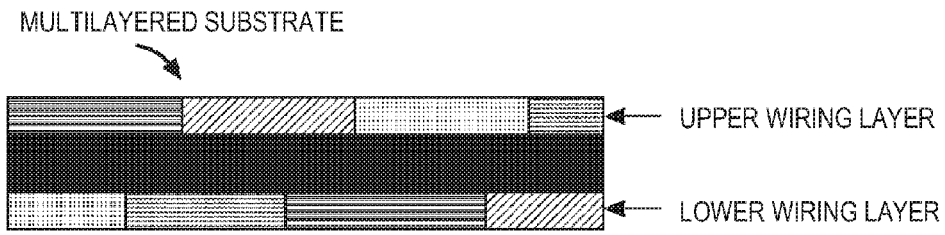

MULTILAYERED SUBSTRATE ← UPPER WIRING LAYER
← LOWER WIRING LAYER

FORMULA OF WARPAGE OF BIMETAL $$\delta = \frac{l^2(\alpha_1-\alpha_2)T}{h} \frac{6E_1E_2}{(E_1+E_2)^2+12E_1E_2}$$

$$\delta \propto \frac{L^2\Delta\alpha}{h}$$

$\alpha_1$: AVERAGE COEFFICIENT IN THERMAL EXPANSION OF LOWER WIRING LAYER AND CORE $\alpha_2$: AVERAGE COEFFICIENT OF THERMAL EXPANSION OF UPPER WIRING LAYER $T$: TEMPERATURE DIFFERENCE $E_1$: AVERAGE ELASTIC MODULUS OF LOWER WIRING LAYER AND CORE $E_2$: AVERAGE ELASTIC MODULUS OF UPPER WIRING LAYER $h$: VALUE THAT IS HALF OF THICKNESS OF MULTILAYERED SUBSTRATE

FIG. 1

(1) TWO-DIMENSIONAL DISCRETIZATION OF MATERIAL
A. TOP SIDE PATTERN
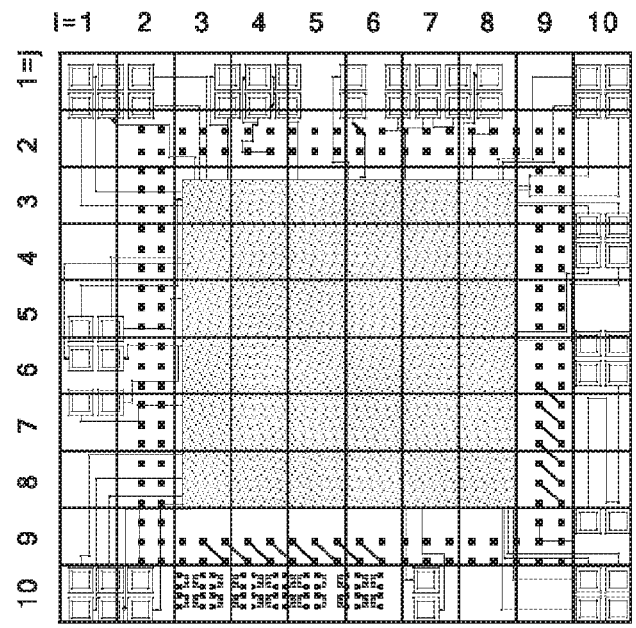
B. BOTTOM SIDE PATTERN
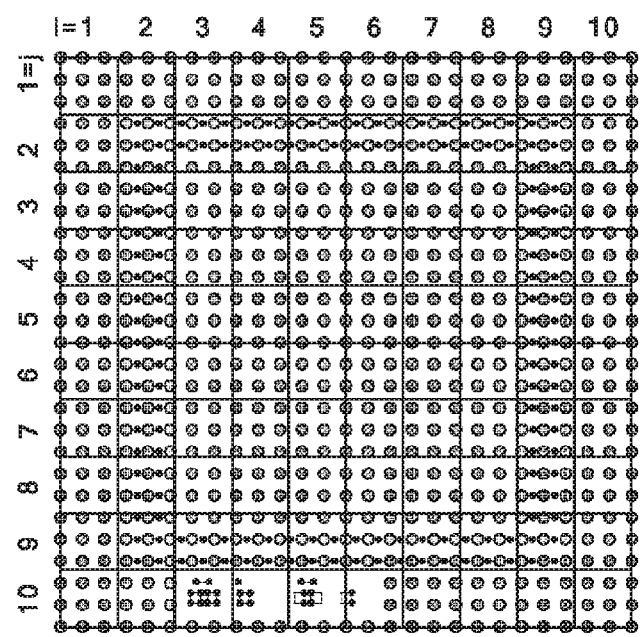
FIG. 5

(2) CALCULATION OF CHARACTERISTIC OF COMPOSITE MATERIAL IN EACH ELEMENT

- DETERMINE DIFFERENCE BETWEEN OCCUPANCIES $V_{Aij}$ AND $V_{Bij}$ FOR ELEMENT A AND DETERMINE $\Delta\alpha_{ij}$

- $V_{Aij}$ AND $V_{Bij}$ ARE DETERMINED BY DETERMINING WHETHER EACH ELEMENT CONTAINS WIRING OR NOT FROM DESIGN DRAWING IMAGE $$\Delta\alpha_{ij} = \alpha_{Aij} - \alpha_{Bij}$$

$\alpha_{ij}$ IS CALCULATED ACCORDING TO THE FOLLOWING COMMON FORMULA $$\alpha_{ij} = \frac{\alpha_m E_m V_m + \alpha_f E_f V_{fij}}{E_m V_m + E_f V_{fij}}$$

$V$ : OCCUPANCY
$E$ : ELASTIC MODULUS (YOUNG'S MODULUS)

SUBSCRIPT
$m$ : RESIN SUBSTRATE MATERIAL
$f$ : WIRING MATERIAL (Cu)

FIG. 6

(5) CORRECTION OF PATTERN WITH RELATIVELY GREAT LENGTH SCALE $\Delta\alpha c_{ij} : fc(xi, yj)$

PATTERN CORRECTION OCCURS IN ANY OF FOLLOWING MANNERS:

- ADD CORRECTING DUMMY WIRING LAYER TO PATTERN
- ADJUST WIRING DENSITY OF PART OF WIRING LAYER LESS AFFECTED BY MODIFICATION
- CORRECT WIRING PATTERN ITSELF (6) CALCULATION OF WARPAGE AFTER CORRECTION
DIVIDE SURFACE INTO ELEMENTS AND CALCULATE WARPAGE ACCORDING TO FINITE ELEMENT METHOD
A. TOP SIDE PATTERN AFTER CORRECTION
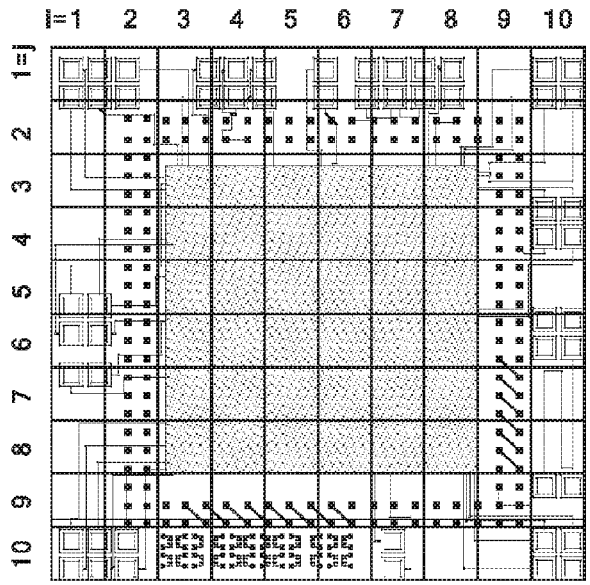
B. BOTTOM SIDE PATTERN AFTER CORRECTION
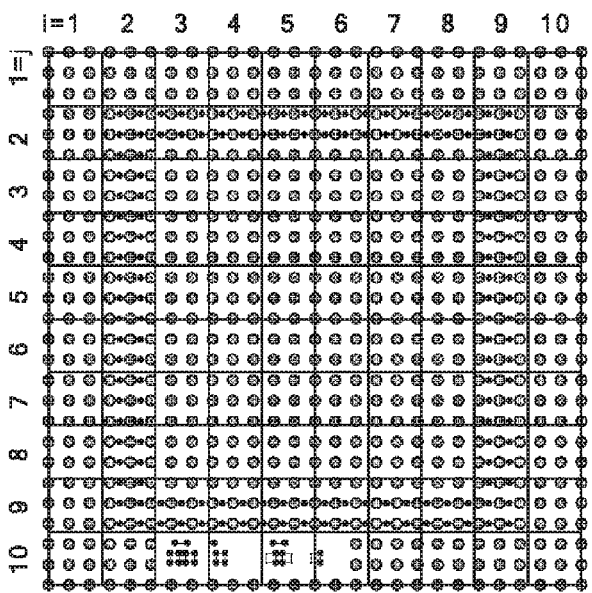
FIG. 9

MULTILAYERED WIRING SUBSTRATE MODEL: METHOD OF
CALCULATING COMPOSITE BODY PARAMETERS $E_\perp, \alpha_\perp = E_x, \alpha_x$
x, z direction Subscript
M : (MAIN MATERIAL)
F : Cu WIRING (Fiber)

$$E_\parallel = V_F E_F + (1 - V_F) E_M$$

$$\alpha_\parallel = \frac{\alpha_M E_M (1 - V_F) + \alpha_F E_F V_F}{E_M (1 - V_F) + E_F V_F}$$

$$E_\perp = \frac{1}{V_F/E_F + (1 - V_F)/E_M}$$

$$\alpha_\perp = \alpha_M (1 - V_F) + \alpha_F V_F$$

EXAMPLE OF MULTILAYERED WIRING SUBSTRATE MODEL: RESULT OF
CALCULATING COMPOSITE BODY PARAMETERS

MULTILAYERED SUBSTRATE MODEL

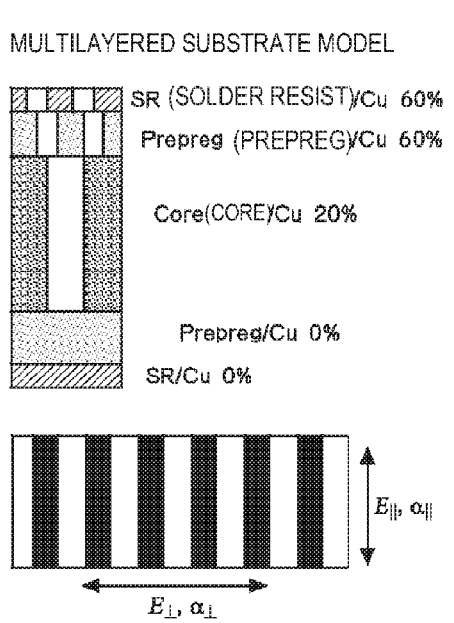

TABLE OF MATERIAL PROPERTIES

| MATERIAL | CTE (ppm) | E(GPa) | Poisson Ratio |
|---|---|---|---|
| Cu | 16.5 | 117 | 0.32 |
| Solder Resist | 60 | 2.5 | 0.29 |
| Prepreg | 25 | 4 | 0.34 |
| Core | 15 | 18 | 0.2 |

COMPOSITE MATERIAL PARAMETERS

| | $E_\parallel$ (GPa) | $\alpha_\parallel$ (ppm) | $E_\perp$ (GPa) | $\alpha_\perp$ (ppm) |
|---|---|---|---|---|
| SR/Cu 60% | 71.2 | 17.1 | 6.1 | 33.9 |
| PrePreg/Cu 60% | 71.8 | 16.7 | 9.5 | 19.9 |
| Core/Cu 20% | 37.8 | 15.9 | 21.7 | 15.3 |

FIG. 12

INPUT VALUES OF MULTILAYERED WIRING SUBSTRATE MODEL SIMULATION

MULTILAYERED WIRING SUBSTRATE MODEL

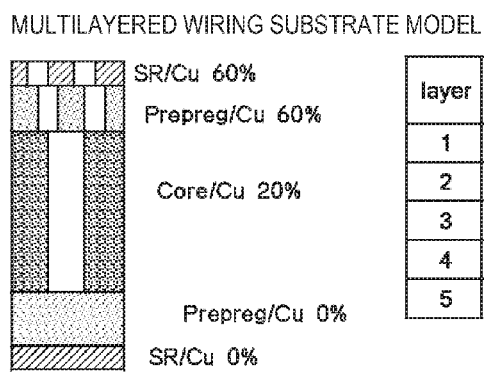

| layer | Material | t(μm) | E(GPa) | CTE (ppm) |
|---|---|---|---|---|
| 1 | SR/Cu 60% | 20 | 6.1 | 33.9 |
| 2 | Prepreg/Cu 60% | 100 | 9.5 | 19.9 |
| 3 | Core/Cu 20% | 500 | 21.7 | 15.3 |
| 4 | Prepreg/Cu 0% | 100 | 4 | 25 |
| 5 | SR/Cu 0% | 20 | 2.5 | 60 |

FIG. 13

SUMMARY OF MULTILAYERED BEAM THEORY

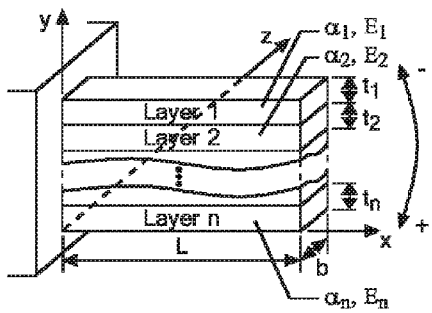

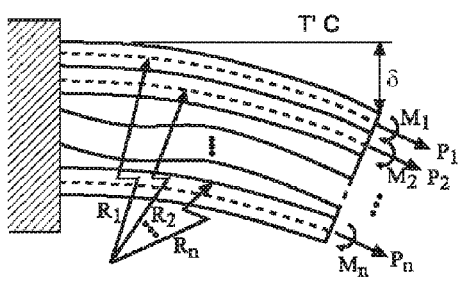

Strain due to the temperature change T $$\varepsilon_i' = \alpha_i T$$

$\alpha_i$ : thermal expansion coefficient of $i^{th}$ layer

Moment in $i^{th}$ layer $$M_i = \frac{E_i I_i}{R_i}$$

$I_i$ : second moment of the cross section
$R_i$ : radius of curvature

Strain due to $P_i$ $$\varepsilon_i'' = \frac{P_i}{b t_i E_i}$$

$P_i$ : axial force in i layer
$b$ : width of the layer
$t_i$ : thickness of the $i^{th}$ layer
$E_i$ : modulus of the $i^{th}$ layer Strain due to $M_i$ $$\varepsilon_i''' = \frac{M_i y}{E_i I_i} = \frac{y}{R_i}$$

Total strain $$\varepsilon_i' + \varepsilon_i'' + \varepsilon_i''' = \alpha_i T + \frac{P_i}{b_i t_i E_i} + \frac{y}{R_i}$$

FIG. 14
Prior Art

SIMULTANEOUS EQUATIONS OF MULTILAYERED BEAM THEORY

I. Continuity at the boundaries $$\alpha_1 T + \frac{P_1}{b_1 t_1 E_1} - \frac{t_1}{2R_1} = \alpha_2 T + \frac{P_2}{b_2 t_2 E_2} - \frac{t_2}{2R_2}$$

$$\rightarrow (\alpha_1 + \alpha_2)T = -\frac{P_1}{b_1 t_1 E_1} + \frac{P_2}{b_2 t_2 E_2} + \frac{t_1}{2R_1} + \frac{t_2}{2R_2}$$

II. Balance of the force along the axis $$0 = P_1 + P_2 + A + P_n$$

III. Balance of the moment $\sum_i^n P_i = 0$ $$\sum_i^n M_i = P_1 \left( \bar{y} - \frac{t_1}{2} \right) + P_2 \left( \bar{y} - t_1 - \frac{t_2}{2} \right) + A + P_n \left( \bar{y} - t_1 - t_2 A - \frac{t_n}{2} \right) = 0$$

$$\rightarrow 0 = P_1 \left( \bar{y} - \frac{t_1}{2} \right) + P_2 \left( \bar{y} - t_1 - \frac{t_2}{2} \right) + A + P_n \left( \bar{y} - t_1 - t_2 A - \frac{t_n}{2} \right) + \frac{\sum_i^n E_i I_i}{R}$$

Assumption : since $R \gg t_i$ $$M_i = \frac{E_i I_i}{R_i} \qquad R_1 \cong R_2 \cong A \cong R_n = R$$

Solve for Ps and R

FIG. 15
Prior Art

METHOD OF ADDING DUMMY WIRING TO PART TO BE CORRECTED

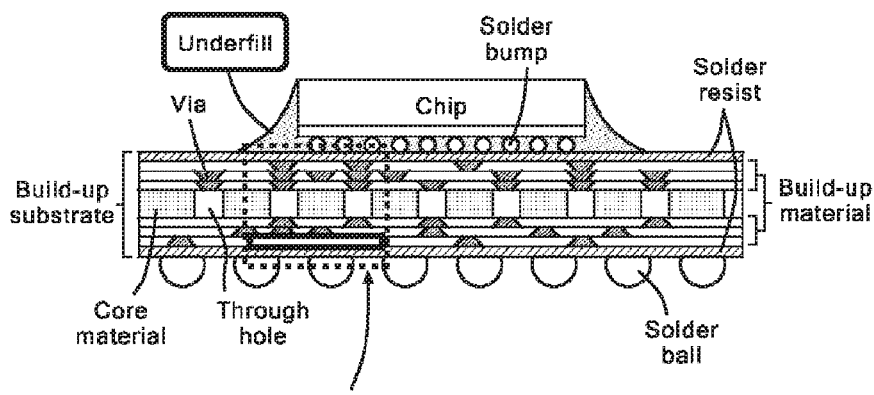

PROVIDED THAT PART IN DOTTED-LINE RECTANGLE IS TO BE CORRECTED, ADD DUMMY WIRING LAYER TO PART WITH NO WIRING IN PART IN THICK SOLID RECTANGLE, FOR EXAMPLE

FIG. 16

REDUCTION OF WARPAGE OF MULTILAYERED SUBSTRATE OR PACKAGE

BACKGROUND OF THE INVENTION

Field of the Invention

The present invention relates to a warpage of a multilayered substrate in implementation of electronic equipment. More specifically, controlling a warpage of a multilayered substrate in which different materials—a resin substrate material and a wiring material—are distributed two-dimensionally in an upper wiring layer and a lower wiring layer.

Description of Related Art

In implementation of electronic equipment, there is a problem of a warpage of a multilayered substrate or package. A warpage of a multilayered organic substrate occurs primarily because of asymmetry of the coefficient of thermal expansion (CTE) between upper and lower wiring layers thereof.

In the upper and lower wiring layers of the multilayered organic substrate, different materials—a resin substrate material and a wiring material—are distributed two-dimensionally.

The resin substrate material is typically an insulating resin, and the wiring material is typically a conductive metal. Therefore, these materials have significantly different coefficients of thermal expansion and elastic moduli, or elasticity, E.

When the wiring material is distributed in the resin substrate material, the wiring material cannot be, inherently, of perfect geometric symmetry, and therefore the distribution of the wiring material is asymmetric. In this respect, there is a demand for a method of optimizing wiring.

According to a known approach to reduce a warpage, a dummy pattern is formed so that the upper and lower wiring layers of the substrate have equal wiring densities. However, at present, there is no way to numerically determine which part should be preferentially corrected in wiring density, and technicians have to empirically or intuitively make the determination.

As a known second best solution, there is a concept of determining an average coefficient of thermal expansion, which is an average of the coefficients of thermal expansion of the upper and lower wiring layers. According to this concept, a warpage of a substrate is analyzed by adjusting the wiring pattern so that the density of the wiring layers is uniform over the whole of the substrate. However, the difference in coefficient of thermal expansion can partially or locally increase, or some wiring patterns cannot be modified for convenience of wiring.

At present, even a partial or local modification of the wiring pattern is usually empirically or intuitively made by the designer of the wiring pattern.

Japanese Patent No. 4204530 describes an FEM analysis that involves dividing an area, in which precise calculation of the warpage is needed, into a fine mesh of elements and dividing an area, in which precise calculation of the warpage is not needed into a coarse mesh of elements.

Japanese Patent No. 3329667 describes a method of determining the position of a reinforcing member with respect to a warpage of a printed circuit board.

PCT Application Publication No. WO 2010/021287 describes a warpage prediction program based on the finite element method (FEM).

Japanese Patent No. 4204524 and Japanese Application Publication Nos. 2012-3460, 2001-14865, 2010-118523, 2010-87145, 2009-260123 describe analyses of a warpage of a substrate based on the finite element method, which can be used for reference purposes.

However, no technique has been found that focuses on variations of the difference in average coefficient of thermal expansion $\Delta\alpha$ in a substrate and is based on, and applies to a correction, a concept of distinguishing between the difference in coefficient of thermal expansion $\Delta\alpha$ with a greater length scale (a lower frequency) that has a significant effect on the warpage and the difference in coefficient of thermal expansion $\Delta\alpha$ with a smaller length scale (a higher frequency) that has a less significant effect on the warpage.

SUMMARY OF THE INVENTION

One aspect of the present invention provides a computer implemented method of performing a calculation associated with controlling warpage of a multilayered substrate. The method includes the steps of (1) discretizing a two-dimensional surface of the multilayered substrate into finite planar elements, where the multilayered substrate has an upper wiring layer and a lower wiring layer, where the upper and lower wiring layers are made of at least two different materials having different elastic moduli, and where the materials are distributed two-dimensionally with different occupancies; (2) calculating a difference in coefficient of thermal expansion of the two-dimensional surface based on composite properties determined from two elastic moduli, two occupancies and the difference between the two occupancies obtained for each element; (3) calculating the warpage of the multilayered substrate based on the calculated composite properties of the two-dimensional surface according to a finite element method; (4) calculating a maximum length scale that corresponds to an allowable warpage; (5) extracting an element involved with a pattern having a length scale greater than the maximum length scale by digital filtering of the difference in coefficient of thermal expansion to produce an extracted element; (6) reducing the difference in coefficient of thermal expansion by adjusting a mixing ratio of the two different occupancies for the extracted element involved with the pattern having a length scale greater than the maximum length scale to produce an adjusted mixing ratio; (7) calculating the warpage of the substrate based on the adjusted mixing ratio of the two different occupancies according to the finite element method; and (8) repeating steps (5), (6) and (7) until the calculated warpage falls below the required warpage.

Another aspect of the present invention provides an information processing system for performing a calculation associated with controlling a warpage of a multilayered substrate. The information processing system includes a memory; a processing device communicatively coupled to the memory; and a calculation performance module communicatively coupled to the memory and processing device, where the calculation performance module is configured to perform a method that includes: (1) discretizing a two-dimensional surface of the multilayered substrate into finite planar elements, where the multilayered substrate has an upper wiring layer and a lower wiring layer, where the upper and lower wiring layers are made of at least two different materials having different elastic moduli, and where the materials are distributed two-dimensionally with different occupancies; (2) calculating a difference in coefficient of thermal expansion of the two-dimensional surface based on composite properties determined from two elastic moduli, two occupancies, and difference between the two occupancies obtained for each finite planar element; (3) calculating the warpage of the multilayered substrate based on the calculated composite properties of the two-dimensional surface according to a finite element method; (4) calculating a maximum length scale that corresponds to an allowable warpage; (5) extracting an element involved with a pattern having a length scale greater than a maximum length scale by digital filtering of the difference in coefficient of thermal expansion to produce an extracted element; (6) reducing the difference in coefficient of thermal expansion by adjusting a mixing ratio of the two different occupancies for the extracted element involved with a pattern having a length scale greater than the maximum length scale to produce an adjusted mixing ratio; (7) calculating the warpage of the multilayered substrate based on the adjusted mixing ratio of the two different occupancies according to the finite element method; and (8) repeating steps (5), (6) and (7) until the calculated warpage falls below a required warpage.

Another aspect of the present invention provides a computer implemented method for performing a calculation associated with controlling warpage in a multilayered substrate, where the multilayered substrate has an upper wiring layer and a lower wiring layer, where the upper and lower wiring layer are each made of at least two different materials that have different elastic moduli, where the materials are distributed two-dimensionally with different occupancies, where a two-dimensional surface of the substrate is discretized into finite planar elements. The method includes the steps of: calculating a difference in coefficient of thermal expansion according to composite properties of the two-dimensional surface determined from two elastic moduli, two occupancies, and difference between the two occupancies obtained for each element; calculating the warpage of the multilayered substrate based on the calculated composite properties of the two-dimensional surface according to a finite element method; extracting an element involved with a pattern having a relatively great length scale by digital filtering of the calculated difference in coefficient of thermal expansion to produce an extracted element; and calculating the difference in coefficient of thermal expansion according to the finite element method based on an adjusted mixing ratio of the two different occupancies for the extracted element involved with a pattern having a length scale greater than a maximum length scale.

Another aspect of the present invention provides a computer readable non-transitory article of manufacture tangibly embodying computer readable instructions which, when executed, cause a computer to carry out the steps of the above methods.

BRIEF DESCRIPTION OF THE DRAWINGS

FIG. 1 is a diagram for illustrating a formula for calculating a warpage (δ) of a multilayered substrate formed by a bimetal.

FIG. 5 is a diagram for illustrating two-dimensional discretization of a material.

FIG. 6 is a diagram for illustrating a calculation of characteristics of a composite material in each element.

FIG. 9 is a diagram for illustrating calculation of the warpage after the correction.

FIG. 12 is a diagram showing a result of the calculation of the composite body parameters using an example of the multilayered wiring substrate model.

FIG. 13 is a diagram showing input values for a multilayered wiring substrate model simulation.

FIG. 14 is a diagram showing a summary of a multilayered beam theory.

FIG. 15 is a diagram showing simultaneous equations of the multilayered beam theory.

FIG. 16 is a diagram for illustrating a method of adding a dummy wiring to a part to be corrected in applying the present invention to a multilayered substrate or package.

DETAILED DESCRIPTION OF THE PREFERRED EMBODIMENTS

An object of the present invention is to provide an efficient correction method that minimizes adjustment of a wiring layer in reducing a warpage of a multilayered substrate or package. A more specific object of the present invention is to enable the locating of a part of a wiring layer for correction as to effectively reduce a warpage while performing the correction.

The difference in average coefficient of thermal expansion (Δα) varies in a substrate. The present invention focuses on the fact that the difference in coefficient of thermal expansion (Δα) with a great length scale, a low frequency, has a significant effect on the warpage, and the difference in coefficient of thermal expansion (Δα) with a small length scale, a high frequency, has a less significant effect on the warpage. Based on this principle, only the difference in coefficient of thermal expansion (Δα) with a great length scale, or a low frequency, is corrected. The correction is performed by determining the distribution of the difference in coefficient of thermal expansion Δα in a plane of an organic substrate and then determining a part to be corrected by performing digital filtering to extract the difference in coefficient of thermal expansion with a low frequency and determining the difference in coefficient of thermal expansion (Δα) between before and after correction.

The result of the digital filtering that filters out the difference in coefficient of thermal expansion with a high frequency shows a part that requires correction. According to the present invention, correction of a wiring layer performed to reduce a warpage of a substrate can be minimized, and correction can be performed on only a part of the substrate that requires correction.

FIG. 1 is a diagram for illustrating a formula for calculating a warpage (δ) of a multilayered substrate formed by a bimetal. The formula is well known as a formula that expresses a warpage of a bimetal in the field of strength of materials. The multilayered substrate has an upper wiring layer and a lower wiring layer. Each wiring layer is composed of at least two different materials—a resin substrate material, m, and a wiring material, f—having different elastic moduli (E), which are distributed two-dimensionally with different occupancies (V). This diagram shows four different materials distributed. As can be seen, the warpage ($\delta$) is proportional to the difference in coefficient of thermal expansion ($\Delta\alpha$).

Figure 2:
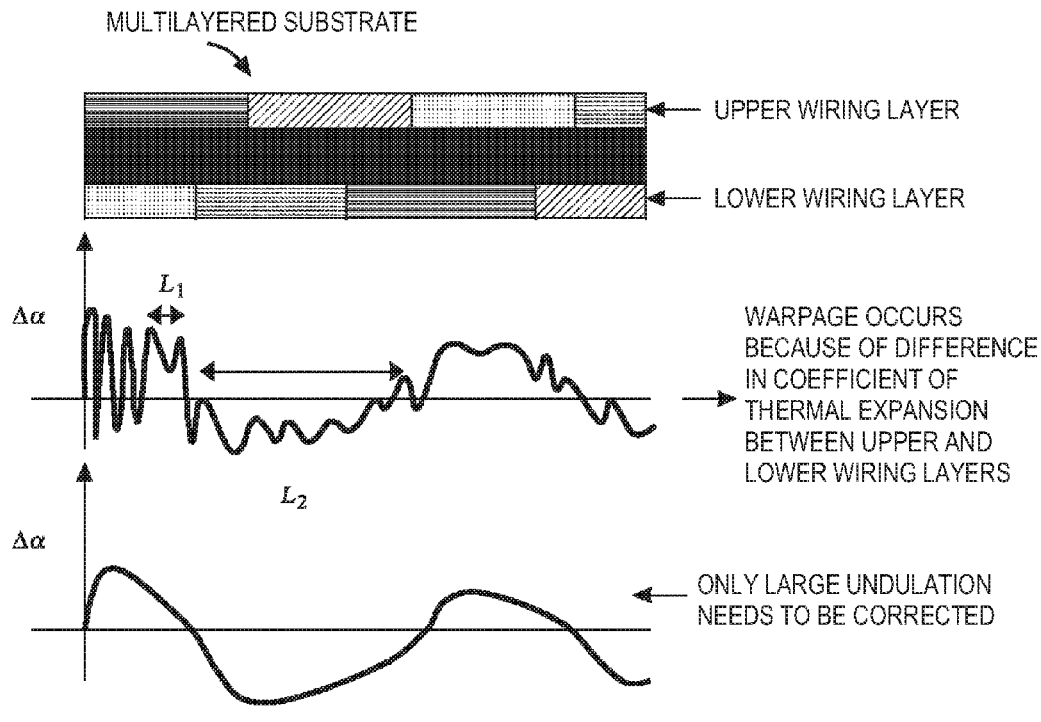
FIG. 2 is a diagram illustrating that the difference in average coefficient of thermal expansion (Δα) varies in the multilayered substrate.

FIG. 2 is a diagram illustrating that the difference in average coefficient of thermal expansion ($\Delta\alpha$) varies in the multilayered substrate. As shown by the graph, a warpage occurs because of the difference in coefficient of thermal expansion ($\Delta\alpha$) between the upper and lower wiring layers. The difference in coefficient of thermal expansion ($\Delta\alpha$) has a pattern (L1) that has a relatively small length scale (L) and a pattern (L2) that has a relatively great length scale (L).

According to the present invention, it is enough to correct only a large undulation that corresponds to the pattern (L2) that has a relatively great length scale (L). In addition, a characteristic length Lmax for an allowance warpage ($\delta$max) can be determined according to the formula for a bimetal shown in FIG. 1.

Figure 3:
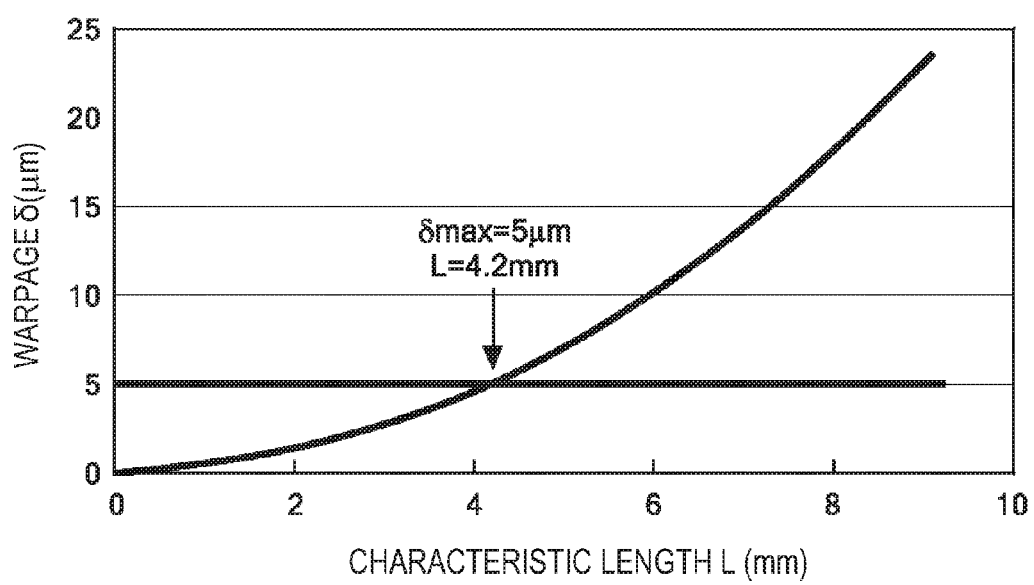
FIG. 3 shows a graph showing a relationship between a characteristic length scale (L) and a warpage (δ).

FIG. 3 shows a graph showing a relationship between the characteristic length (L) and the warpage ($\delta$). If the allowable warpage ($\delta$max) is 5 μm, the characteristic length L is 4.2 mm. Various other values of the allowable warpage ($\delta$max) can be specified by taking into consideration safety factors or other parameters. The allowable warpage ($\delta$max) can be set as a threshold for determining whether a finite element method (FEM) simulation can be ended or not. The allowable warpage ($\delta$max) can be automatically calculated by a computer or input to a computer to be used for a computation.

Figure 4:
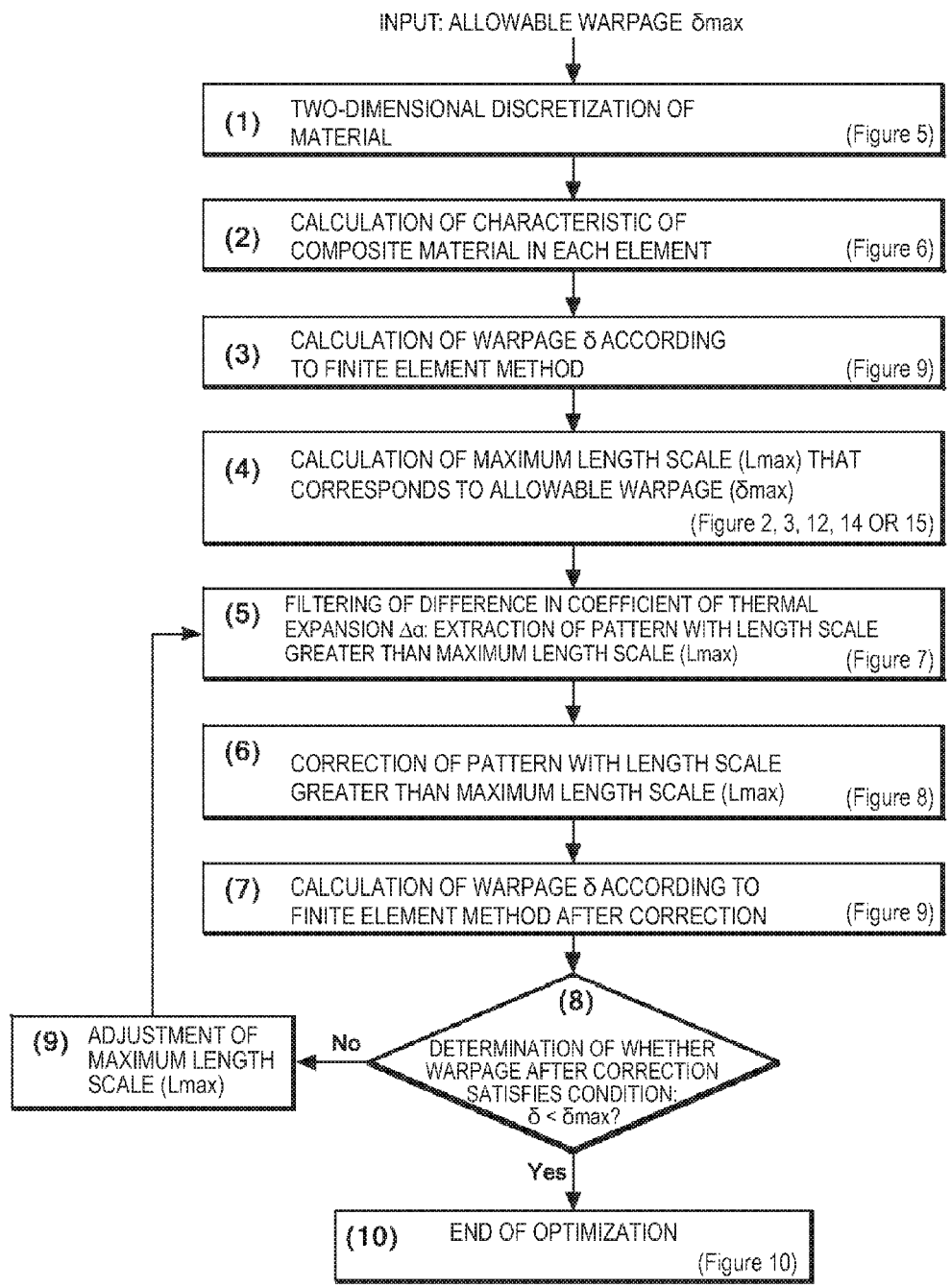
FIG. 4 is a flowchart showing the whole of a method according to the present invention.

FIG. 4 is a flowchart showing each step of the method according to the present invention. As shown, during each step, a process is performed. For purposes of clarity, each process is given a number in the flowchart and thereby corresponds to the numbers of the subsequent drawings.

(1) Two-dimensional discretization of the substrate corresponds to FIG. 5.

(2) Calculation of characteristics of a composite material in each element corresponds to FIG. 6.

(3) Calculation of the warpage $\delta$ according to the finite element method corresponds to FIG. 9.

(4) Calculation of the maximum length scale (Lmax) corresponding to the allowable warpage ($\delta$max) corresponds to FIG. 2, 3, 12, 14 or 15.

Figure 7:
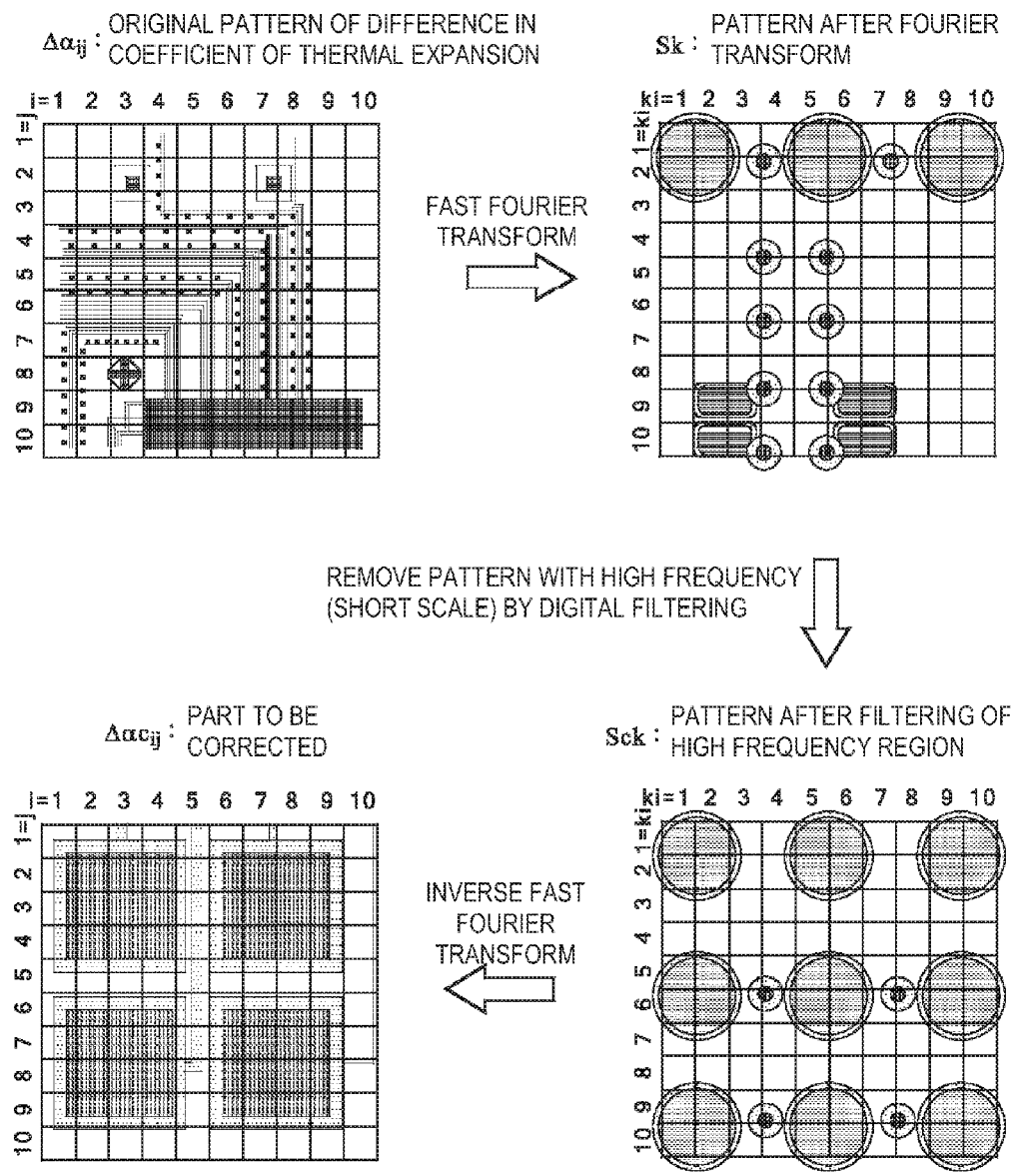
FIG. 7 is a diagram for illustrating extraction of patterns having a length scale (L) greater than a maximum length scale (Lmax) by digital filtering of the difference in coefficient of thermal expansion (Δα).

(5) Extraction of a pattern having a length scale greater than the maximum length scale (Lmax) by filtering of the difference in coefficient of thermal expansion $\Delta\alpha$ corresponds to FIG. 7.

Figure 8:
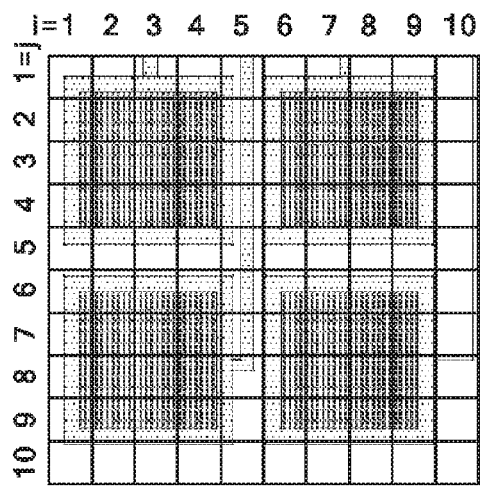
FIG. 8 is a diagram for illustrating correction of patterns having a length scale (L) greater than the maximum length scale (Lmax).

(6) Correction of the pattern having a length scale greater than the maximum length scale (Lmax) corresponds to FIG. 8.

(7) Calculation of the warpage $\delta$ according to the finite element method after the correction corresponds to FIG. 9.

(8) It is determined whether the calculated value of the warpage after the correction satisfies the required condition: $\delta<\delta$max.

(9) The maximum length scale (Lmax) is adjusted.

Figure 10:
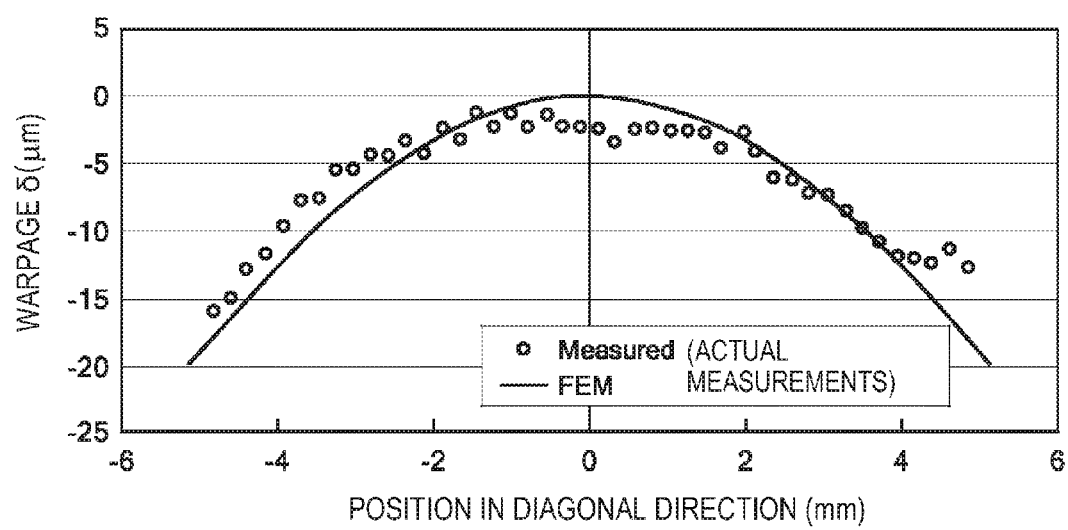
FIG. 10 is a diagram showing an example of the warpage calculated according to a finite element method (FEM) and actual measurements for comparison.

(10) Ending of optimization corresponds to FIG. 10.

That is, the method according to the present invention includes the steps described below.

(1) A step of discretizing the two-dimensional surface of the substrate into finite planar elements.

(2) A step of calculating the difference in coefficient of thermal expansion ($\Delta\alpha$) of the two-dimensional surface based on the composite properties determined from two elastic moduli (E), two occupancies (V), and the difference between the two occupancies (V) obtained for each element.

(3) A step of calculating the warpage ($\delta$) of the substrate based on the calculated composite properties of the two-dimensional surface according to the finite element method (FEM).

(4) A step of calculating the maximum length scale (Lmax) that corresponds to the allowable warpage ($\delta$max).

(5) A step of extracting an element involved with a pattern having a length scale greater than the maximum length scale (Lmax) by digital filtering of the difference in coefficient of thermal expansion ($\Delta\alpha$).

(6) A step of reducing the difference in coefficient of thermal expansion ($\Delta\alpha$) by adjusting the mixing ratio of the two different occupancies (V) for the element involved with the pattern (2 L) having a length scale (L) greater than the maximum length scale (Lmax).

(7) A step of calculating the warpage ($\delta$) of the substrate based on the adjusted mixing ratio of the two different occupancies (V) according to the finite element method (FEM).

(8) A step of repeating the steps (5), (6) and (7) until the calculated warpage ($\delta$) falls below the allowable warpage ($\delta$max).

FIG. 5 is a diagram for illustrating two-dimensional discretization of a material. The finite element method is used herein. The finite element method (FEM) is a numerical analysis approach for numerically determining an approximate solution of a differential equation that is difficult to analytically solve. The finite element method involves dividing a domain in which an equation is defined into smaller regions, or elements, and determining a relatively simple common interpolation function that approximates to the equation in each smaller region.

The finite element method was first developed in the field of structural mechanics and has become widely used in other fields. The theory behind the finite element method is associated with functional analysis and mathematically systematic.

In the case of a static analysis, provided that a complicated structure is regarded as an aggregate of small elements, a linear equation is solved by substituting a boundary condition, i.e., Dirichlet condition or Neumann boundary condition, of displacement at each node into the linear equation.

Structural analysis of a deformation of a target structure caused by an external force, for example, is generally achieved in a displacement method, in which displacement is an unknown quantity, or a stress method, in which stress is an unknown quantity. The structural analysis based on the finite element method is typically achieved in the displacement method.

According to the present invention, which is intended to calculate the warpage, the displacement method is used. In step (1), the two-dimensional surface of the substrate to be simulated is discretized into finite planar elements. In the example shown in this drawing, the two-dimensional surface is discretized into 100 (10×10) finite elements in total, 10 elements 1 to 10 in an i direction by 10 elements 1 to 10 in a j direction.

A parameter that changes in a finite element is typically prepared as an array for containing a variable in a software program, and the simulation is carried out through cooperation of many memory areas, or hardware resources.

In the description herein, the simulation method is described as being based on the finite element method (FEM). However, a wide variety of other numerical analysis methods, such as the boundary element method and the difference method, can be applied. In this respect, the phrase or expression "calculate according to the finite element method (FEM)" should be construed broadly.

FIG. 6 is a diagram for illustrating a calculation of characteristics of the composite material in each element. In step (2), characteristics of the composite material in each element, that is, composite properties of the two-dimensional surface can be calculated according to a formula that is well-known in the field of strength of materials.

FIG. 7 is a diagram for illustrating extraction of patterns having a length scale (L) greater than the maximum length scale (Lmax) by digital filtering of the difference in coefficient of thermal expansion ($\Delta\alpha$). By digital filtering of the difference in coefficient of thermal expansion ($\Delta\alpha$), elements involved with the patterns having a relatively great length scale can be extracted. These patterns can be visualized as shown in the drawing.

The digital filtering of the difference in coefficient of thermal expansion ($\Delta\alpha$) performed for extracting elements involved with patterns having a relatively great length scale in step (5) can be a digital filtering performed after a fast Fourier transform, and an inverse fast Fourier transform can be performed after the digital filtering. Although the processing based on the fast Fourier transform has an affinity for the digitized discretized processing, the applicability of the present invention is not limited thereto.

FIG. 8 is a diagram for illustrating correction of patterns having a length scale (L) greater than the maximum length scale (Lmax). The correction means adjustment of the mixing ratio of the two different occupancies (V) for the elements involved with the patterns (L2) whose extracted length scale (L) is relatively great.

The correction can be carried out in at least three optional ways. First, the correction can be an adjustment that involves adding a correcting dummy wiring layer to the part of the pattern. Second, the correction can be an adjustment of the wiring density of the wiring material f in a part of the wiring layer that is not significantly affected by the adjustment. Third, the correction can be an adjustment of the wiring pattern itself in the wiring layer.

After the correction, the calculation according to the finite element method (FEM) can be performed again. The part to be corrected can be automatically recognized and calculated by a computer or can be input to a computer for computation through manual adjustment by a user.

FIG. 9 is a diagram for illustrating calculation of the warpage after the correction. FIG. 10 is a diagram showing an example of the warpage calculated according to the finite element method (FEM) and actual measurements for comparison.

As can be seen from the diagram, the calculated warpage tends to agree with the actual measurements.

Figure 11:
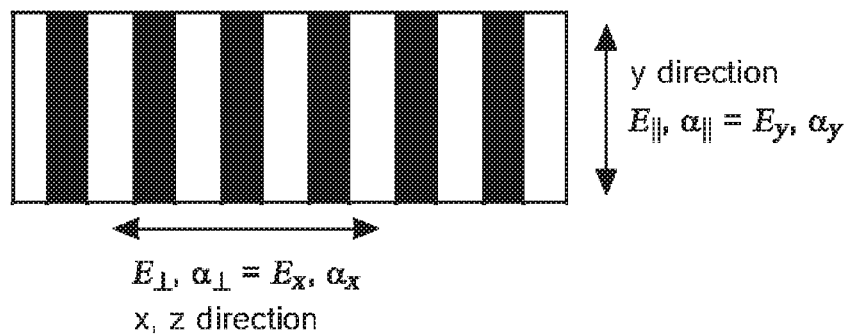
FIG. 11 is a diagram for illustrating a method of calculating composite body parameters using a multilayered wiring substrate model.

FIGS. 11 to 13 illustrate a multilayered wiring substrate model. An average volume ratio of a Cu (copper) wiring can be used, and such a model can be used for determining the characteristic length scale for the allowable warpage.

FIGS. 14 and 15 depict a known model that can also be used for determining the characteristic length scale for the allowable warpage. As described above, the characteristics of the mixed material can be calculated in various methods.

FIG. 16 is a diagram for illustrating a method of adding a dummy wiring to a part to be corrected in applying the present invention to a multilayered substrate or package. This is an application as an implementation package for electronic equipment. The wiring can be corrected by placing a dummy wiring at a part having a great length scale.

We claim:

1. A computer readable non-transitory article of manufacture tangibly embodying computer readable instructions which, when executed, cause a computer to control a warpage of a multilayered substrate, the computer readable instructions comprising:
   first instructions to discretize a two-dimensional surface of the multilayered substrate into finite planar elements, wherein the multilayered substrate has an upper wiring layer and a lower wiring layer, wherein the upper and lower wiring layers are made of at least two different materials having different elastic moduli, and wherein the materials are distributed two-dimensionally with different occupancies;
   second instructions to calculate a difference in coefficient of thermal expansion of the two-dimensional surface based on composite properties determined from two elastic moduli, two occupancies, and difference between the two occupancies obtained for each finite planar element;
   third instructions to calculate the warpage of the multilayered substrate based on the calculated composite properties of the two-dimensional surface according to a finite element method;
   fourth instructions to calculate a maximum length scale that corresponds to an allowable warpage;
   fifth instructions to extract an element involved with a pattern having a length scale greater than a maximum length scale by digital filtering of the difference in coefficient of thermal expansion to produce an extracted element;
   sixth instructions to reduce the difference in coefficient of thermal expansion by adjusting a mixing ratio of the two different occupancies for the extracted element involved with a pattern having a length scale greater than the maximum length scale to produce an adjusted mixing ratio;
   seventh instructions to calculate the warpage of the multilayered substrate based on the adjusted mixing ratio of the two different occupancies according to the finite element method; and
   eighth instructions for repeating steps of said fifth, sixth and seventh instructions until the calculated warpage falls below a required warpage.

2. The article of manufacture according to claim 1, wherein the fifth instructions for digital filtering are performed after a fast Fourier transform.

3. The article of manufacture according to claim 1, further including instructions for performing an inverse fast Fourier transform after the digital filtering.

4. The article of manufacture according to claim 1, wherein the sixth instructions for adjusting a mixing ratio of the two different occupancies for the extracted element involved with the pattern having a length scale greater than the maximum length scale is an adjustment that involves adding a dummy wiring layer.

5. The article of manufacture according to claim 1, wherein the sixth instructions for adjusting a mixing ratio of the two different occupancies for the extracted element involved with the pattern having a length scale greater than the maximum length scale is an adjustment of a wiring density of a wiring material in a wiring layer.

6. The article of manufacture according to claim 1, wherein the sixth instructions for adjusting a mixing ratio of the two different occupancies for the extracted element involved with a pattern having a length scale greater than the maximum length scale is an adjustment of a wiring pattern in a wiring layer.

7. A computer implemented method for performing a calculation associated with controlling warpage in a multilayered substrate, wherein the multilayered substrate has an upper wiring layer and a lower wiring layer, wherein the upper and lower wiring layer are each made of at least two different materials that have different elastic moduli, wherein the materials are distributed two-dimensionally with different occupancies, wherein a two-dimensional surface of the substrate is discretized into finite planar elements, the method comprising the steps of:

calculating a difference in coefficient of thermal expansion according to composite properties of the two-dimensional surface determined from two elastic moduli, two occupancies, and difference between the two occupancies obtained for each element;

calculating the warpage of the multilayered substrate based on the calculated composite properties of the two-dimensional surface according to a finite element method;

extracting an element involved with a pattern having a relatively great length scale by digital filtering of the calculated difference in coefficient of thermal expansion to produce an extracted element; and calculating the difference in coefficient of thermal expansion according to the finite element method based on an adjusted mixing ratio of the two different occupancies for the extracted element involved with a pattern having a length scale greater than a maximum length scale.

8. The computer implemented method of claim 7, wherein the method further comprises the step of calculating a maximum length scale that corresponds to an allowable warpage.

9. A computer readable non-transitory article of manufacture tangibly embodying computer readable instructions which, when executed, cause a computer to carry out a method for controlling a warpage of a multilayered substrate, wherein the multilayered substrate has an upper wiring layer and a lower wiring layer, wherein the upper and lower wiring layer are each made of at least two different materials that have different elastic moduli, wherein the materials are distributed two-dimensionally with different occupancies, wherein a two-dimensional surface of the substrate is discretized into finite planar elements, the computer readable instructions comprising:

first instructions to calculate a difference in coefficient of thermal expansion according to composite properties of the two-dimensional surface determined from two elastic moduli, two occupancies, and difference between the two occupancies obtained for each element;

second instructions to calculate the warpage of the multilayered substrate based on the calculated composite properties of the two-dimensional surface according to a finite element method;

third instructions to extract an element involved with a pattern having a relatively great length scale by digital filtering of the calculated difference in coefficient of thermal expansion to produce an extracted element; and fourth instructions to calculate the difference in coefficient of thermal expansion according to the finite element method based on an adjusted mixing ratio of the two different occupancies for the extracted element involved with a pattern having a length scale greater than a maximum length scale.

10. The article of manufacture of claim 9, wherein the computer readable instructions further comprises: instructions to calculate a maximum length scale that corresponds to an allowable warpage.

* * * * *